Aug. 3, 1954
W. L. BADGER
2,685,249
DEEP FAT COOKING APPARATUS
Filed Oct. 31, 1951
3 Sheets-Sheet 1
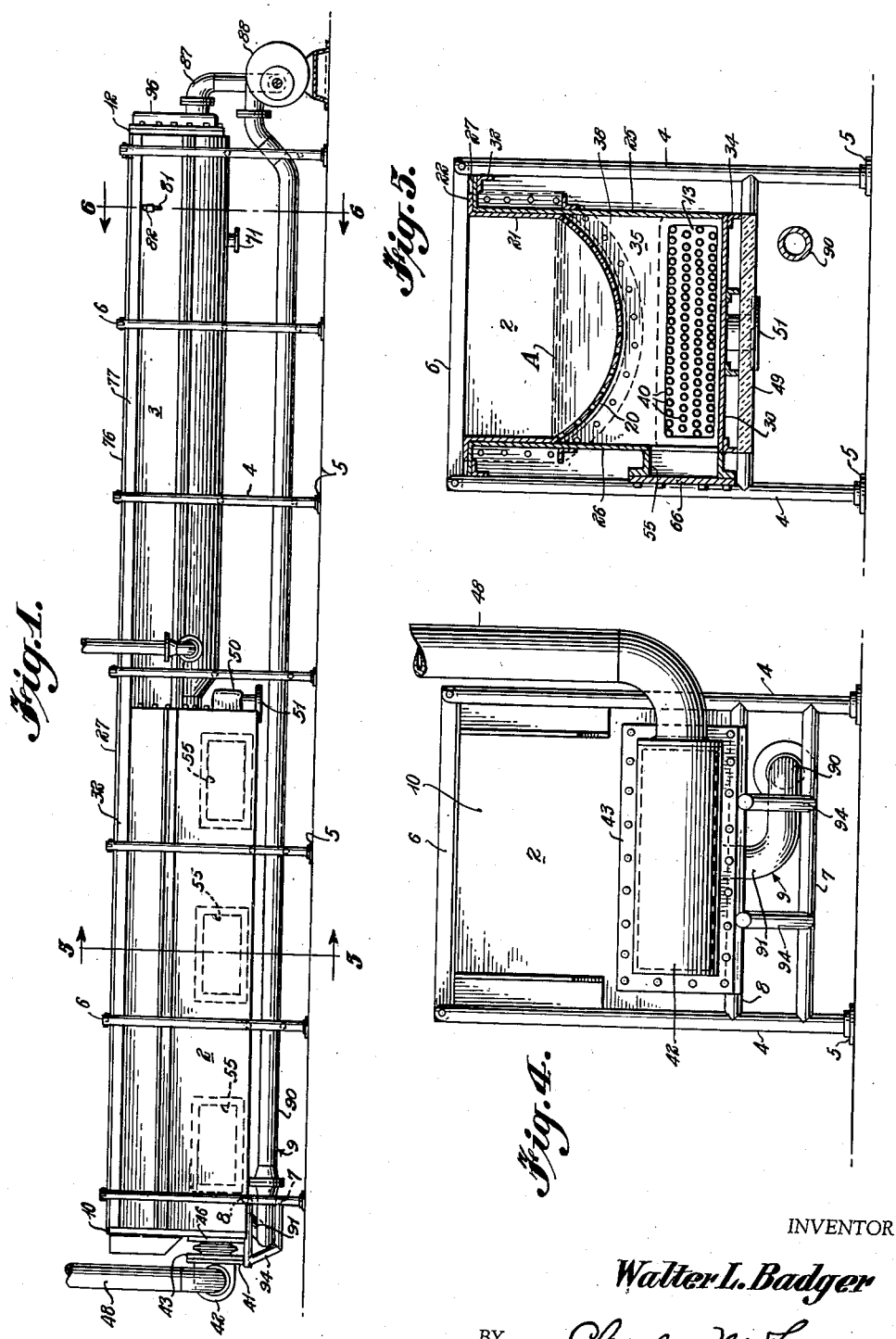
INVENTOR
*Walter L. Badger*
BY *Charles M Thomas*
ATTORNEY Aug. 3, 1954
W. L. BADGER
2,685,249
DEEP FAT COOKING APPARATUS
Filed Oct. 31, 1951
3 Sheets-Sheet 2
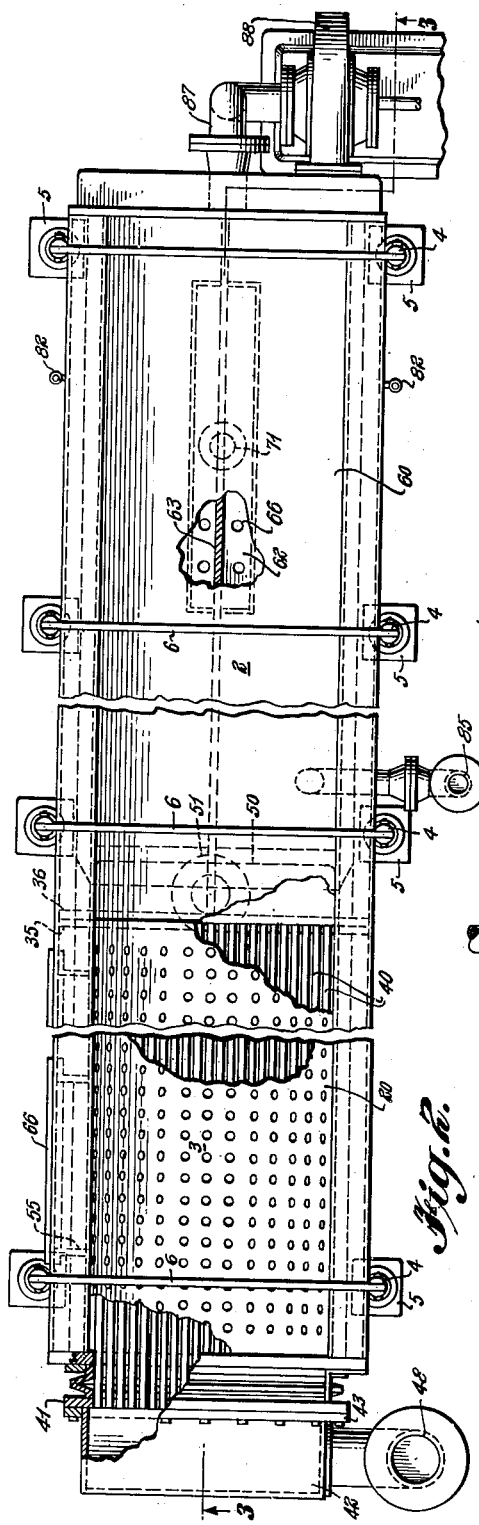
INVENTOR
Walter L. Badger
BY
Charles M. Thomas
ATTORNEY

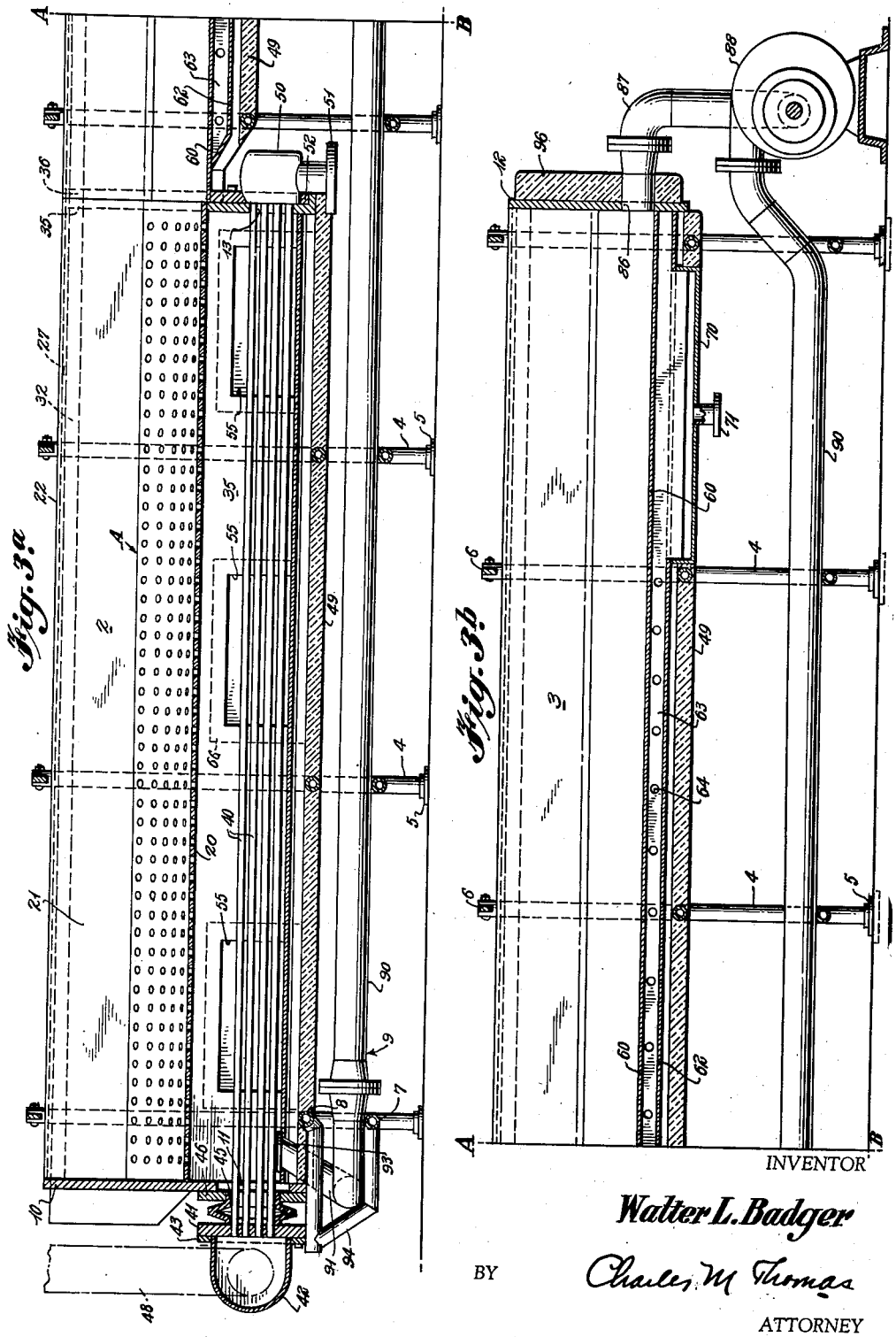

Patented Aug. 3, 1954

2,685,249

UNITED STATES PATENT OFFICE 2,685,249

DEEP FAT COOKING APPARATUS

Walter L. Badger, Ann Arbor, Mich., assignor to Wise Potato Chip Company, Berwick, Pa., a corporation of Pennsylvania Application October 31, 1951, Serial No. 254,106

13 Claims. (Cl. 99—403)

This invention relates to an improvement in cooking apparatus for cooking food products such as potato chips and the like which are normally cooked to the desired degree in a hot bath of deep fat. More particularly, it relates to an apparatus and method wherein such foods are subject to a deep fat bath of relatively high temperature and short duration for the purpose of expelling a large proportion of the water from the food cooked, and subsequently subjecting the food to a second and more prolonged cooking bath at a substantially lower temperature where the cooking process is completed.

It is to be appreciated that the temperatures of the cooking bath are often quite critical, the food product very frequently being affected by even slight changes in temperature during cooking. Thus, too rapid heating of the cooking fat or overheating of the same often causes deleterious effects upon the substance cooked. Superheating may result in a tendency of the food to rapidly decompose, or it may impart to the food undesirable tastes and odors, and, further, it may cause the substance cooked to become rancid in a relatively short period of time. This is particularly true in the cooking of potato chips, where the quality and appearance thereof may be quickly and adversely affected by even slight variations in temperature of the cooking bath.

In cooking some types of foods, and particularly potatoes in the manufacture of potato chips, the greater part of the heat utilized is required to initially evaporate the water from the fresh chips. Once evaporation of the water has been accomplished to a substantial degree, only a relatively moderate amount of heat is necessary to maintain the temperature of the fat to a degree necessary for the final cooking. Thus, in the apparatus of my invention, provision is made for an initial, quick cooking zone having a large heating surface capable of supplying relatively high temperatures, and this quick cooking section is followed by a cooking zone having a lesser heating surface where lower temperatures can be maintained at a constant sufficient only to properly cook the substance without the undesirable effects referred to. The apparatus is particularly adaptable to continuous operation, involving a minimum of manual intervention by the operator.

It is well known that heat transfer from saturated vapor not only gives a very high rate of heat transfer but also makes possible very precise temperature control due to the fact that the temperature of the saturated vapor depends only on its pressure. The temperatures involved in deep fat cooking are too high to use steam at any reasonable temperature and, therefore, the apparatus of this invention contemplates the use, as a heating medium, of Dowtherm vapors. Control by Dowtherm vapors is facilitated by the instant apparatus which is adaptable to precise temperature control, by the use of proper pressure relationships for the temperatures desired in deep fat cooking. Hence, by altering the pressure of the Dowtherm vapor supplied, by any well-known means, the temperature of the vapor, and consequently the temperature of the two cooking sections, is readily controlled.

Accordingly, it is a primary object of my invention to provide an apparatus and method for cooking potato chips or like materials in hot fat to obtain a cooked product of uniform quality and appearance.

It is a further object of the invention to provide an apparatus wherein provision is made for initial high temperature cooking to expel water from the substance cooked, followed by relatively low temperature cooking to complete the process.

An additional object of the invention is to provide apparatus wherein the temperature control of the two stated stages of cooking is readily accomplished and to eliminate substantial variation from the constant, desirable temperature in either the initial or secondary cooking of the food.

A further objective of the invention is the provision of apparatus which precludes possible overheating of the cooking fat, so as to prevent the substance cooked from developing undesirable odors, tastes, or tendency to become rancid.

It is apparent that other objects and advantages of my invention will be recognized from the following detailed description of a preferred embodiment thereof as illustrated in the accompanying drawings, wherein:

Figure 1 is a side elevation view of a preferred embodiment of my invention;

Figure 2 is a plan view partly broken away of the invention shown in Figure 1;

Figure 3a is a view in section taken on the line 3—3 of Figure 2 and broken at the line A—B;

Figure 3b is a view taken on the line 3—3 of Figure 2 and continuing Figure 3a at the line A—B;

Figure 4 is an end elevation view of the invention as shown in Figure 1;

Figure 5 is a section view taken on the line 5—5 of Figure 1; and

Figure 6 is a section view taken on the line 6—6 of Figure 1.

Referring more particularly to the drawings, it will be seen that the apparatus of my invention contemplates a pair of two cooking trough sections of different construction which are herein generally designated at 2 and 3. The first of these, section 2, comprises a relatively deep container of rectangular cross-section for relatively quick cooking at high temperatures, whereas section 3 of the apparatus is of relatively shallow cross-section and adapted for slow cooking at substantially lower temperatures. These two cooking sections 2 and 3 are interconnected at their open ends and in substantial horizontal alignment with each other and are supported by a series of uprights 4, terminating in any standard type of base 5, suitably affixed to the floor. The uprights 4 are interconnected at their respective tops by tie rods 6 and, as herein shown, are further strengthened by cross rods 7 at their lower portions. An additional series of cross rods 8, located immediately underneath the deep cooking section 2, are desirable for additional rigidity of the support structure as are cross rods 9, which are underneath cooking section 3 but higher and immediately adjacent the shallow cooking trough. The first cooking section, section 2, is closed by end plate 10 and, at the opposite end of the apparatus, the second cooking section 3 is similarly closed by an end plate 12. End plate 10 has an opening 11 and end plate 12, an opening 86, for purposes to be later described.

Cooking section 2 may be characterized as the quick cooking section. It is fitted with a perforated concave trough 20 which extends horizontally throughout its length and which, as seen in Figure 5, is provided with imperforate side walls 21. These side walls terminate in right angular extensions or flanges 22 which afford support for the trough. The trough is preferably made of stainless steel or some equivalent material impervious to the high temperatures or corrosive action of materials used in the cooking process. This trough 20 is encased in a container, similarly fabricated of stainless steel or other non-corrosive metal, and comprising two side walls 25 and 26. These are provided with an interconnecting bottom wall 30. The container may also be considered as a rectangular trough with an impervious bottom and side walls, and is herein characterized as the deep section of the apparatus.

Each of the side walls 25 and 26 also terminates at their respective upper ends in right angular flanges 27. These flanges 27 rest upon a series of brackets 32 which are affixed to each of the uprights 4 throughout the length of the apparatus. Thus, these brackets 32 support the flanges 27 and, in turn, the flanges 22, the latter suspending the perforated trough substantially above the level of the bottom wall 30. Referring to the latter, this bottom wall 30 is also supported by a series of angle irons or brackets 34 which are mounted on each of the cross bars 8. One end of the perforated trough 20 is, of course, closed off by the end plate 10, whereas the opposite end of the trough is not completely closed off but affixed to plate 35, which may be bolted thereto, and which conforms to the curvature of the said trough 20. Plate 35 is, in turn, connected to its counterpart, plate 36, which is the end plate of section 3, or the slow cooking section of the apparatus. Plate 35 is further provided with a lower opening 13, the purpose of which will presently be seen.

As stated, a relatively high temperature is desired in section 2, or the quick cooking section of the invention, and to this end, a series of longitudinal flue pipes or heat transfer tubes 40 are placed adjacent the bottom wall 30 so as to directly contact the cooking fat in this cooking section. It will be seen from the foregoing description that the trough 20 is mounted directly above such flue pipes and longitudinally therewith, thus forming a flue chamber 38. These pipes at one end extend through opening 13 and interconnect with a condensation receiver 50, the latter being provided with a flanged outlet 51 for interconnection to a recycling circuit, not here shown. Condensation receiver 50 is suitably flanged as at 52, said flange being bolted, or otherwise secured, to plate 35. At their opposite ends, the heat transfer tubes 40 are positioned in a header 41 which is, in turn, suitably affixed to a manifold or vapor feed box 42. As shown, manifold 42 has a flange 43 to which the header is bolted. The manifold receives vapors from the conduit 48, attached at its other end to a suitable source of supply. From vapor feed box 42, these vapors are forced throughout the length of the respective tubes 40. As these tubes are subject to relatively high temperatures, provision must be made for movement thereof due to temperature variation and consequent expansion or contraction of the same. This is provided for by an expansion joint 45 which is here shown as of the bellows type. However, any suitable type of expansion device may be used. The expansion joint 45 is suitably affixed to the header 41 and the flange 46 of the end plate 10 in any manner well-known to the art. Heat transfer tubes 40 are thus permitted to move with respect to end plate 10 in accordance with variations in length thereof due to temperature change.

Trough section 2 is also provided with means to facilitate access to the interior thereof. A plurality of rectangular clean-out necks 55 extend along one side of the forward cooking container or trough section 2. These are normally closed by plates 66 suitably bolted to such necks. Removal of plates 66 enables cleaning out of the chamber 38, and the bottom of the container. The size and distance apart of these necks is such that when the cover plates 66 are removed, all parts of the tubes and container bottom can be reached with brushes or other cleaning devices. The bottom of the structure just described is provided with suitable insulation 49 throughout the length thereof for obvious purposes.

From the foregoing description, it will be understood that in operation of the invention, trough 20 will be submerged in the deep fat but fairly near the surface thereof, the purpose of such perforated trough being to keep the greater part of the material being cooked from settling down upon the tubes 40.

Referring now to section 3 of the invention, or the slow cooking section, it will be seen that this section is similarly fitted with a trough 60 also of stainless steel or similar metal impervious to corrosive action. However, although concave and similar in shape to trough 20, this trough 60 is not perforated. The trough 60 terminates at one end in end plate 36 to meet endwise with plate 35 and perforated trough 20, as previously indicated, and, at the opposite end, is closed by end plate 12. As will be seen, the trough 60 comprises the top of a heating jacket to which vapor is admitted. It is provided at the sides thereof with angular flanges 61 and throughout its longitudinal center axis with a depending baffle rib 63, the latter being apertured throughout its length as indicated at 64.

An additional trough or plate 62 is mounted underneath trough 60 and is of relatively the same dimensions but spaced therefrom, as will be seen by reference to Figure 6. This added plate 62, not being in contact with cooking fluids, may be of ordinary steel plate. It is affixed to the rib 63 and end flanges 61 of the imperforate trough 60 in any well-known manner, and when positioned as shown in Figure 6, plate 62, with trough 60 and flanges 61, forms a heating chamber or jacket generally indicated at 65 to which the vapors are supplied. Thus jacket 65 forms the bottom of the shallow slow cooking section 3 of the apparatus.

It is obvious that for different food products, the amount of heating surface in the form of tubes, and the amount of surface in the form of the described jacket relative to each other, can be altered to suit the desired conditions.

Near the end of section 3 which is opposite the quick cooking section, an additional chamber or condensation sump 70 is provided. As will be seen by reference to Figure 2, this sump is approximately one-third as long as the entire section 3. This runs along the longitudinal axis of the trough 60 and immediately underneath the rib 63. Apertures 66 in trough 60 on each side of baffle rib 63 open into the sump. This sump 70, also of trough shape or half tubular in configuration, is provided near its midpoint with a depending conduit 71. The purpose of the sump is to accumulate condensate which may be formed in heating chamber 65 between the two troughs 60 and 62. Baffle 63, depending into the sump, facilitates directing condensate into the sump. It will be appreciated that such liquid as is formed in the heating jacket is free to flow downwardly through openings 66 into jacket 70, thence into conduit 71, to be recycled in any desired manner by means of further apparatus not herein shown.

Surmounting the imperforate trough 60 are sides 75, each having an angular extension 74 complementary to the flanges 61 of trough 60. Thus, it will be seen that the trough 60, sides 75, and end plates 12 and 36, form an enclosure comprising the slow cooking chamber. At the opposite ends of these side members 75, further right angular flanges 76 enable support of the sides, such flanges resting upon side brackets 77 which are placed on each of the upright supports 4. Rigidity of the structure thus far described is further assured by the provision of angular projections 78 on each side of the trough. These projections are so disposed that their upper surface is at right angles to flanges 61 and angular extensions 74. In this manner, any tendency of the trough arrangement to straighten is converted into a thrust directly against supports 4, and this thrust is taken up by the cross rods 7 and 9. Flanges 61 and 74 may be welded or joined together in any manner known to the art. As previously indicated, the concave bottom 62 of chamber 65 is similarly affixed at each of its longitudinal edges to flanges 61. Cross rods 9 thus substantially aid in further support of the structure thus far described with reference to trough section 3 of the invention.

At the discharge end of jacket 65, gas vents for the discharge of non-condensed vapors are provided. To this end, small holes are drilled through flanges 61, flange extensions 74 and the insulation surrounding the slow cooking chamber, to receive relatively small vent pipes 81 which are equipped with pressure release mechanisms 82 of any standard and desirable kind. Such pressure release mechanisms for control of discharged or vented vapors may be ordinary stop valves well-known in the art.

Dowtherm vapor is supplied to the heating space or chamber 65 between troughs 60 and 62 by a suitable inlet line 85. The source of vapor supply may be the same as that of inlet conduit 48. Condensate is removed by outlet 71 in the manner described and uncondensed vapors discharged through vent pipes 81 and stop valves 82.

It is desirable to keep the cooking oil which is being used in the apparatus in a state of constant motion; in other words, to have the cooking fat flow along the two troughs from the deep section to the shallow section. In order to accomplish this, the end plate of section 2 of the apparatus is provided with an opening 86, previously referred to, which is interconnected with a discharge conduit 87. The latter leads to a centrifugal pump 88, here diagrammatically indicated as being a vane rotary pump of the eccentric type. The pump 88 withdraws cooking fluid through conduit 86 and discharges the same through conduit 90 to the opposite end of the apparatus. The hot oil or cooking fluid is thus caused to flow from trough sections 2 into section 3, or from the quick cooking section of the apparatus to the slow cooking section through opening 86, conduit 87, suction pump 88, conduit 90, line 91 and opening 93 in quick cooking section 2. Conduits 87, 90, 91 and pump 88 are of sufficient capacity to produce the desired velocity through the troughs from feed end to discharge end. It will be noted that the manifold 42 together with the interconnecting expansion joint 45 is supported upon a bracket structure 94 affixed to the end supporting rods 4. This same bracket is ample to also support the recycling conduit 90 together with conduit 91 which directly leads into the slow cooking section. Conduit 91 leads through an appropriate opening 93 in the forward part of section 2 near end plate or bulkhead 10.

It is, of course, desirable to provide the slow cooking section of the invention with additional insulation such as that covering the bottom of the trough 62, herein designated at 95. Similarly the sides of the imperforate trough section may be surrounded by insulation 97 as shown in Figure 6.

As previously indicated, the two sections are interconnected as shown in Figure 2. Thus, the forward end plate 36 of the slow cooking section conforms to the configuration of the end plate 35 of the quick cooking section. It is thus apparent that whereas the quick cooking section is adapted to receive a rather large body of cooking oil comparatively deep and kept comparatively hot by the series of tubes 40 having a large heat transfer area, the slow cooking section, with its imperforate trough, mounted above jacket 65, provides a cooking chamber of relatively shallow depth, jacket 65 offering a substantially lesser heat transfer area.

As seen in Figure 6, any known type of stirrers or paddles 100 may be suspended from tie rods 6 to facilitate motion of the cooked substances through the two cooking sections, or to constantly agitate such substances as to insure all surfaces thereof being properly cooked.

The operation of the invention should be apparent from the foregoing description thereof. Cooking fat is supplied in the desired amount to both the quick and slow cooking trough sections 2 and 3 to the common level indicated at A, Figure 5. At this level, it will be appreciated that the depth of cooking fat in the quick cooking section 2 is substantially greater than its depth in the slow cooking section 3. A saturated vapor from a suitable source is supplied through the inlet conduit 48 and, in turn, to the series of tubular elements 40. Likewise, vapor is supplied from inlet conduit 85 to the chamber or jacket 65. It being understood that a greater amount of heat is required to evaporate the water from, for example, potato chips, than to completely cook the chips, the heat exchange apparatus of the first cooking section is designed to maintain the cooking fat at a relatively high temperature. This can be appreciated from the heating system employed in this section which comprises a relatively large number of longitudinal tubes through which is forced saturated vapor in the requisite amount. These flue pipes 40 will present a greater heat transfer surface than is provided by the bottom jacket 65 in the slow cooking section. Thus the greater amount of heat required to evaporate the water from potato chips introduced into the quick cooking trough section 2 is provided in said section and the relatively less amount of heat required for final cooking purposes is provided in the slow cooking trough section 3. It is to be observed that by a continuous flow of cooking fat which is circulated by the pump 88 through both slow and quick cooking sections, the potato chips are caused to flow out of the quick cooking trough section 2, after a substantial amount of water has been evaporated therefrom, into the slow cooking trough section 3, thus enabling the operation to be continuous and without undue manual intervention.

Ordinarily temperatures required in deep fat cooking are too high to enable the use of steam exchange units. Thus, I have found it preferable to employ in the use of this invention, saturated vapors of the Dowtherm type. These not only give the highest rate of heat transfer, but also enable precise temperature control due to the fact that temperature is directly dependent upon the pressures utilized. Any suitable control valves not shown may be provided in the vapor supply pipes 48 and 85 to enable control of these pressures and, hence, control of the resultant temperatures. This precise control of temperatures in the quick and slow cooking trough sections 2 and 3 has the advantage of making it easy to obviate slight changes and variations in temperatures with resultant overheating and consequent deleterious effects upon the food as already outlined.

As many variations are possible within the scope of this invention, I do not intend the same to be limited in any manner except as defined by the appended claims.

What I claim is:

1. A cooking apparatus comprising at least two trough shaped sections in communication with each other, a container for cooking fluids, one of said sections being perforated and mounted in said container, the other of said sections being imperforate and in alignment with said perforated section, means for circulating said fluids through both of said sections, means in said container having a large heat transfer surface area to transfer a large amount of heat to said one section, and means in said other section having a lesser heat transfer area to transfer a lesser amount of heat to said other section.

2. Apparatus for deep fat cooking comprising a pair of trough shaped sections in alignment with each other, a container for cooking fat, one of said sections being perforated and mounted in a container, the other of said sections being in alignment and communication with said perforated section, said other section being imperforate, means for circulating said fat in sequence through both of said sections, heat exchange means in said one section having a large heat transfer area, and heat exchange means of a smaller heat transfer area in said other section, whereby large amounts of heat may be imparted to said one section and smaller amounts of heat applied to said other section.

3. Apparatus for deep fat cooking comprising a pair of trough shaped sections in alignment and communication with each other, one of said sections being perforated and mounted in a container for cooking fluids, the other of said sections being imperforate for reception of said fluids therein, said container having a heat transfer surface of large area therein comprising a series of longitudinal pipes in said container for heating said fluids, said other section having a heat transfer surface of smaller area comprising a heat transferring jacket along the bottom thereof, the heat transferring area of said pipes being greater than the heat transferring area of said jacket, means to circulate said fluids from said container to said imperforate section, and means to circulate Dowtherm vapors at elevated temperatures through said pipes and to said jacket.

4. In apparatus for cooking fluids, a pair of interconnecting and aligned trough sections, a container for said fluids, one of said sections being perforate and mounted in said container, the other of said sections being imperforate, means to heat said perforate trough section to relatively high temperatures, said means comprising a series of longitudinal pipes in said container having a large total heat exchange area, means to heat said imperforate section to lower temperatures, said last-named means comprising a jacket under said other section having a smaller total heat exchange area, and means to circulate said fluids in sequence through both of said sections.

5. In apparatus for cooking fluids, a pair of interconnecting and aligned trough sections, a container for said fluids, one of said sections being perforate and mounted in said container, the other of said sections being imperforate, said container being of substantially greater volume than said imperforate section, means to impart heat to said perforate trough section to relatively high temperatures, said means comprising a series of longitudinal heat exchange tubes in said container said tubes having a large total heat exchange area, means to heat said imperforate section to lower temperatures, said last-named means comprising a heat exchange jacket under said other section of smaller total heat exchange area, and means to circulate said fluids in sequence through both of said sections.

6. Apparatus for cooking potato chips in cooking liquid comprising a pair of horizontal aligned trough sections with connected open ends whereby said trough sections communicate with each other, said sections being adapted to contain cooking liquid at a common level, said sections being respectively deep and shallow relatively for a greater depth of cooking liquid in the deeper section than in the shallow section, heat transferring flue pipes in the bottom of the deep section for passing a preheated vapor therethrough to heat the liquid in the deep section, and a heat transferring jacket forming the bottom of the shallow section for the introduction of the preheated vapor therein to heat the liquid in the shallow section, the combined heat transferring area of said flue pipes being greater than the heat transferring area of said jacket and said flue pipes being in direct contact with the liquid in the deep section for quicker cooking in the deep section than in the shallow section, and means to circulate the liquid from the deep section through the shallow section to flow potato chips from the deep section into the shallow section.

7. Apparatus for cooking potato chips in cooking liquid comprising a pair of horizontal aligned trough sections with connected open ends whereby said trough sections communicate with each other, said sections being adapted to contain cooking liquid at a common level, said sections being respectively deep and shallow relatively for a greater depth of cooking liquid in the deep section than in the shallow section, heat transferring flue pipes in the bottom of the deep section for passing a preheated vapor therethrough to heat the liquid in the deep section, and a heat transferring jacket forming the bottom of the shallow section for the introduction of the preheated vapor therein to heat the liquid in the shallow section, the combined heat transferring area of said flue pipes being greater than the heat transferring area of said jacket and said flue pipes being in direct contact with the liquid in the deep section for quicker cooking in the deep section than in the shallow section, and means to circulate the liquid for the deep section through the shallow section to flow potato chips from the deep section into the shallow section, comprising a pump with intake and output pipes connected respectively to the shallow and deep sections.

8. Apparatus for cooking potato chips in cooking liquid comprising a pair of horizontal aligned trough sections with connected open ends whereby said trough sections communicate with each other, said sections being adapted to contain cooking liquid at a common level, said sections being respectively deep and shallow relatively for a greater depth of cooking liquid in the deep section than in the shallow section, heat transferring flue pipes in the bottom of the deep section for passing a preheated vapor therethrough to heat the liquid in the deep section, and a heat transferring jacket forming the bottom of the shallow section for the introduction of the preheated vapor therein to heat the liquid in the shallow section, the combined heat transferring area of said flue pipes being greater than the heat transferring area of said jacket and said flue pipes being in direct contact with the liquid in the deep section for quicker cooking in the deep section than in the shallow section, means to circulate the liquid for the deep section through the shallow section to flow potato chips from the deep section into the shallow section, and a foraminous channel member in said deep section partitioning the same over said flue pipes to prevent potato chips from contacting said flue pipes and lying at the same level as the bottom of the shallow section.

9. Apparatus for cooking potato chips in cooking liquid comprising a pair of horizontal aligned trough sections with connected open ends whereby said trough sections communicate with each other, said sections being adapted to contain cooking liquid at a common level, said sections being respectively deep and shallow relatively for a greater depth of cooking liquid in the deeper section than in the shallow section, heat transferring flue pipes in the bottom of the deep section for passing a preheated vapor therethrough to heat the liquid in the deep section, and a heat transferring jacket forming the bottom of the shallow section for the introduction of the preheated vapor therein to heat the liquid in the shallow section, the combined heat transferring area of said jacket, and said flue pipes being in direct contact with the liquid in the deep section for the quicker cooking in the deep section than in the shallow section.

10. Apparatus for cooking potato chips in cooking liquid comprising a pair of horizontal aligned trough sections with connected open ends whereby said sections communicate with each other, said sections being adapted for containing cooking liquid at a common level, said sections being respectively deep and shallow relatively for a greater depth of cooking liquid in the deep section than in the shallow section, said shallow section having a hollow transversely concave bottom for containing a preheated vapor for low temperature heating of the liquid in said shallow section, heat transferring flue pipes in the bottom of the deep section for passing a preheated vapor therethrough to heat the liquid in the deep section to a higher temperature than in the shallow section, and means to circulate the liquid from the deep section through the shallow section back into the deep section to flow potato chips from the deep section into the shallow section.

11. Apparatus for cooking potato chips in cooking liquid comprising a pair of horizontal aligned trough sections with connected open ends whereby said sections communicate with each other, said sections being adapted for containing cooking liquid at a common level, one of said sections being perforated and mounted on a comparatively deep container, said other section being imperforate and comparatively shallow, heat transferring flue pipes in the bottom of the container for passing saturated vapors therethrough to heat the liquid in said container to a higher temperature than in said imperforate section, means to circulate the liquid from the container and perforated section through the shallow section back into the container to flow potato chips from the container into the shallow section, said perforated section partititoning the same over said flue pipes to prevent potato chips from contacting said flue pipes.

12. A cooking apparatus comprising a plurality of aligned trough sections to contain cooking fluids, said sections being in communication with each other, one of said sections being provided with a series of longitudinal heat exchange tubes of large total heat exchange area for application of high temperatures, the other of said sections having a heat transferring jacket of lesser total heat exchange area for application of lower temperatures, means to circulate Dowtherm vapors in contact with said heating surface and said jacket, and means to circulate said fluids through said sections.

13. In a cooking apparatus, a pair of aligned troughs for reception of cooking fluids, said troughs being in communication with each other, a container for said fluids, one of said troughs being perforated and mounted in said container, the other of said troughs being imperforate, heat exchange means of large surface area in said one trough comprising a series of pipes extending the length thereof, heat exchange means of smaller surface area in said other trough comprising a jacket adjacent the bottom thereof, means to admit heated Dowtherm vapors to said pipes and said jacket, and means to constantly flow said fluids from said container and said perforated trough to said imperforate trough.

References Cited in the file of this patent
UNITED STATES PATENTS

| Number | Name | Date |
|---|---|---|
| 1,234,131 | Cleveland | July 24, 1917 |
| 1,707,786 | Ehrhart | Apr. 2, 1929 |
| 1,931,120 | Shroyer | Oct. 17, 1933 |
| 2,074,881 | Witting | Mar. 23, 1937 |
| 2,174,555 | Ferry | Oct. 3, 1939 |
| 2,207,316 | Ferry | July 9, 1940 |
| 2,212,461 | Swartz | Aug. 20, 1940 |
| 2,429,360 | Kells | Oct. 21, 1947 |
| 2,535,905 | Dawson | Dec. 26, 1950 |
| 2,570,628 | Anetsberger | Oct. 9, 1951 |